United States Patent [19]
>
> Break

[11] Patent Number: 4,684,300

[45] Date of Patent: Aug. 4, 1987

[54] ATTACHMENT FOR A VERTICAL MILL

[75] Inventor: Douglas Break, Plymouth, Mich.

[73] Assignee: Ridgetown Ltd., Plymouth, Mich.

[21] Appl. No.: 857,244

[22] Filed: Apr. 30, 1986

[51] Int. Cl.⁴ .............................................. B23C 1/00
[52] U.S. Cl. .................................... 409/134; 409/204
[58] Field of Search ............... 409/231, 232, 214, 202,
409/209, 204, 134, 140, 212, 236, 236, 239, 163,
144; 51/168

[56] References Cited

U.S. PATENT DOCUMENTS

| | | | |
|---|---|---|---|
| 1,488,654 | 4/1924 | Sundstrand . | |
| 2,082,310 | 6/1937 | Turnepseed | 409/163 |
| 2,363,831 | 11/1944 | Clausen | 409/236 |
| 2,373,267 | 4/1945 | Schultz | 409/134 |
| 3,152,811 | 10/1964 | Perrin . | |
| 4,015,510 | 4/1977 | Hodgson | 409/236 |
| 4,034,647 | 7/1977 | Hoglund | 409/236 X |
| 4,266,893 | 5/1981 | Troger et al. | 409/231 X |
| 4,536,111 | 8/1985 | Kielma | 409/234 X |

FOREIGN PATENT DOCUMENTS

| | | | |
|---|---|---|---|
| 2341396 | 2/1975 | Fed. Rep. of Germany | 409/236 |
| 2634254 | 2/1978 | Fed. Rep. of Germany | 409/134 |
| 3042304 | 6/1982 | Fed. Rep. of Germany | 409/140 |
| 47701 | 1/1977 | Japan | 409/236 |
| 623763 | 6/1981 | Switzerland | 409/236 |
| 559782 | 6/1977 | U.S.S.R. | 409/236 |

*Primary Examiner*—William R. Briggs
*Attorney, Agent, or Firm*—Gifford, Groh, VanOphem, Sheridan, Sprinkle & Dolgorukov

[57] ABSTRACT

An attachment for a vertical mill having a quill and a spindle rotatably mounted within the quill which is adapted to rotatably drive one end of a milling cutter. The attachment includes an elongated housing having a semi-cylindrical cavity and in which one end of the housing is clampingly secured to the quill of the vertical mill. In doing so, the milling cutter is contained at least partially within the cylindrical cavity. A rotatable center is rotatably mounted to the other end of the housing and the center is positioned within a conical recess at the lower or free end of the milling cutter or, alternatively, a pilot on the cutter is rotatably received in the other end of the housing. The housing together with the center thus allows the cutter to freely rotate with the spindle while simultaneously supporting the cutter against lateral deflection with respect to its axis of rotation.

4 Claims, 6 Drawing Figures

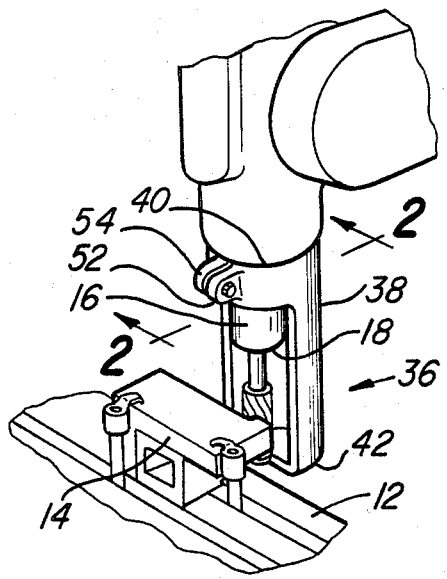
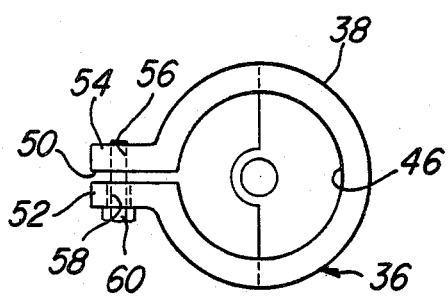
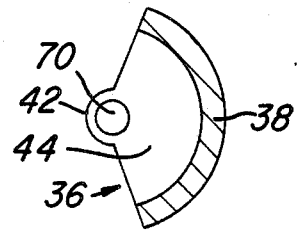
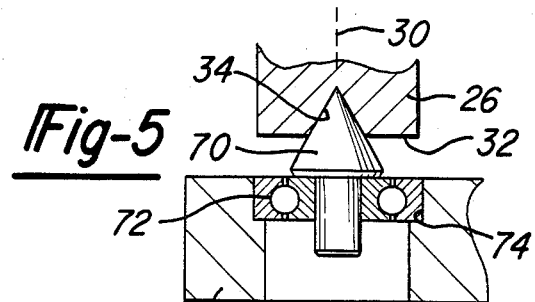
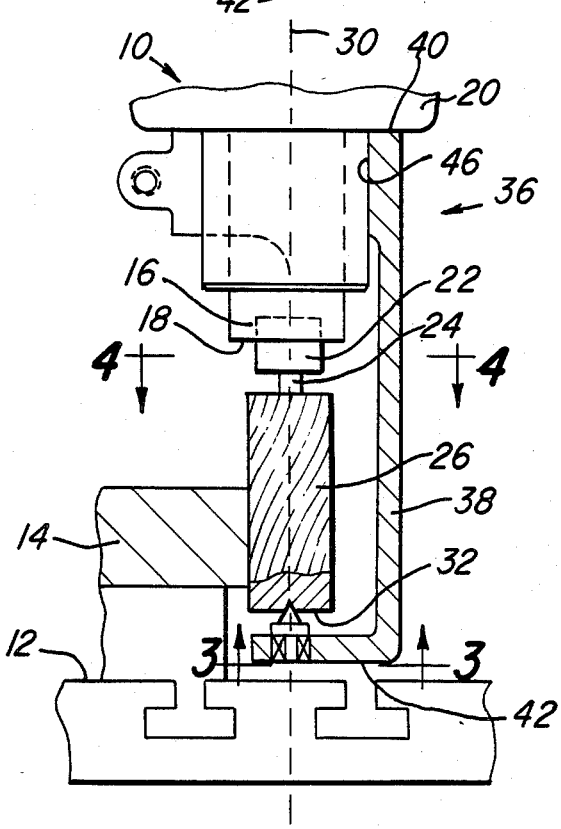
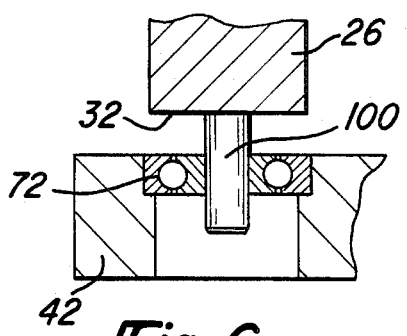

ATTACHMENT FOR A VERTICAL MILL

BACKGROUND OF THE INVENTION

I. Field of the Invention

The present invention relates generally to attachments for vertical mills.

II. Decription of the Prior Art

Vertical mills are conventionally used in machine shops for vertical milling and drilling operations. Such vertical mills typically comprise a work table on which the work is clamped. The work table, furthermore, is movable both laterally and vertically.

A column above the table supports a quill which is vertically slidably movable with respect to the column. A spindle is rotatably mounted within the quill and is adapted to clampingly engage the driveshaft at one end of a milling cutter. Consequently, upon activation of the vertical mill, the spindle rotatably drives the milling cutter around a substantially vertical axis. The cutting operation is then done by adjusting the position of the work table and/or the vertical position of the quill.

Prior to the actual machining operation, it is a common practice for many machinists to first machine a flat vertical surface along one side of the workpiece. This flat surface is then used as a reference surface for the remaining machining operations on the workpiece.

In order to machine a flat reference surface on one side of the workpiece, it has been the previously known practice to attach an end mill to the spindle and then make multiple machining passes along one side of the workpiece until a flat surface is obtained.

There are, however, a number of disadvantages to this previously known method for machining a flat vertical surface on the workpiece.

One difficulty encountered in machining the end of a workpiece with an end mill is that the lateral force imparted to the end mill during the machining operation deflects or bends the end mill outwardly away from the workpiece. Consequently, the machined surface is not perfectly flat and vertical as desired. Furthermore, since the tool bit is subjected to a lateral force and lateral bending with respect to its axis of rotation, the milling cutter frequently breaks during the end milling operation and can injure workmen in the area around the vertical mill. This is particularly true when relatively deep cuts are taken during an end milling operation.

A still further disadvantage of the previously known end milling operations is that the end milling operation leaves "chatter" marks along the machine side of the workpiece. These chatter marks are caused by deflection of the cutter. For many types of work pieces, such chatter marks are unacceptable.

SUMMARY OF THE PRESENT INVENTION

The present invention provides an attachment for a vertical mill which overcomes all the above-mentioned disadvantages of the previously known end milling operations and the like.

In brief, the attachment of the present invention comprises an elongated housing having a semicylindrical cavity. One end of the housing is removably attached to the quill so that, with a cutter held by the spindle, a portion of the cutter is within the housing cavity.

A rotatable center is attached to the opposite or lower end of the housing so that the center is coaxial with the axis of the milling cutter. Furthermore, the center is received within a conical recess formed on the lower end of the milling cutter so that the center allows the milling cutter to freely rotate with the spindle, but supports the milling cutter against lateral deflection with respect to its axis of rotation.

Alternatively, the cutter can be made with a cylindrical pilot which is rotatably received in the bearing.

The attachment of the present invention is advantageously used in end milling operations, keyway cutting operations, hogging, form cutting as well as a variety of other machining operations for vertical mills.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which:

FIG. 1 is an elevational view illustrating a preferred embodiment of the present invention;

FIG. 2 is a sectional view taken substantially along line 2—2 in FIG. 1;

FIG. 3 is a bottom view taken substantially along line 3—3 in FIG. 2;

FIG. 4 is a cross-sectional view taken along line 4—4 in FIG. 2 and with parts removed;

FIG. 5 is an enlarged fragmentary sectional view of a portion of the preferred embodiment; and FIG. 6 is a view similar to FIG. 5 but showing a modification thereof.

DETAILED DESCRIPTION OF PREFERRED EMBODIMENTS OF THE PRESENT INVENTION

With reference first to FIGS. 1 and 2, a portion of a vertical mill 10 is thereshown having a table 12 upon which a work piece 14 is supported and clamped into position in any conventional fashion. A cylindrical quill 16 having a lower end 18 is vertically slidably mounted within a column 20 which is stationarily positioned above the work table 12.

With reference to FIG. 2, in the conventional fashion, a spindle 22 is rotatably mounted to the quill 16 and is adapted to receive the driveshaft 24 of a milling cutter 26, such as an end mill. Any conventional means, such as a draw bar (not shown), is used to lock the milling cutter shaft 24 to the spindle 22 so that the spindle 22 and cutter 26 rotate in unison with each other about a predetermined axis of rotation 30. Any conventional means can be used to rotatably drive the spindle 22. Furthermore, although the quill 16 can move vertically with respect to the column 20, the quill 16 is locked against rotation with respect to the column 20.

As best shown in FIG. 5, during conventional machining operations, the lower end 32 of the milling cutter 26 is typically unsupported. Furthermore, to allow the milling cutter 26 to be sharpened, the milling cutter 26 conventionally includes a conical recess 34 at its lower or free end 32. This conical recess 34 is coaxial with the cutter axis of rotation 30.

With reference now to FIGS. 1 and 2, a preferred embodiment of the attachment 36 of the present invention is thereshown and comprises an elongated body 38 having an upper end 40 and a lower end 42. The body 38 includes a cavity 44 (FIG. 4) between its ends 40 and 42 which is preferable substantially semi-cylindrical in cross-sectional shape.

A throughbore 46 (FIG. 2) is formed longitudinally through the housing 38 at its upper end 40. This throughbore 46, furthermore, has a diameter substantially equal to, or slightly greater than, the diameter of the quill 16 of the vertical mill 10. Consequently, the attachment 36 is positioned on the vertical mill 10 so that the quill 16 extends through the housing throughbore 46 as shown in FIG. 2.

With reference now particularly to FIGS. 1 and 3, in order to attach the housing 36 to the quill 16, a radially extending throughslot 50 is formed to the housing 36 adjacent its upper end. This slot 50 also extends through a pair of tabs 52 and 54 which extend radially outwardly from the housing throughbore 46. One tab 54 includes an internally threaded bore 56 which registers with a throughbore 58 in the other tab 52. A bolt 60 then extends through the bore 58 and threadably engages the bore 56 so that, upon tightening, the bolt 60 draws the tabs 52 and 54 towards each other and simultaneously clamps the upper end 40 of the housing 36 to the quill 16. As best shown in FIG. 2, the upper end 40 of the housing 36 preferably machined flat and positioned on the quill 16 so that the housing upper end 40 flatly abuts against the bottom of the column 20 thereby further rigidifying the attachment between the housing 36 and the quill 16.

With the housing 36 secured to the quill 16 in the fashion described above, the milling cutter 26 is positioned in between the ends 40 and 42 of the housing 36 and so that the milling cutter 26 is partially positioned in, or closely adjacent to, the housing cavity 44. Simultaneously, the bottom 32 of the cutter 26 is positioned closely adjacent the lower end 42 of the attachment housing 36.

As best shown in FIG. 5, a conical center 70 is rotatably mounted to the lower end 42 of the housing 36 by a bearing assembly 72. The bearing assembly is contained within a cylindrical recess 74 so that the axis of rotation of the center 70 is coaxial with the housing throughbore 46 and thus coaxial with the axis of rotation 30 of the milling cutter 26. A throughbore 75 is also open to the bearing 72 to enable easy removal and replacement of the bearing assembly 72 and center 70 as required.

Still referring to FIG. 5, the conical center 70 is received within the lower conical recess 34 of the milling cutter 26. Thus, the center 70 allows the milling cutter 26 to freely rotate about its axis 30 but simultaneously supports the milling cutter 26 against lateral deflection with respect to its axis 30.

With reference to FIG. 6, a modification is there-shown in which a reduced diameter cylindrical pilot 100 extends coaxially outwardly from the lower end 32 of the cutter 26 and is integrally formed with the cutter 26. This pilot 100 is rotatably received in the bearing 72 and supports the cutter against lateral deflection while allowing free rotation of the cutter 26.

In operation, the milling cutter 26 is first locked to the spindle 22 in a conventional fashion. The attachment 30 is then positioned over the quill 16 until the center 70 is positioned within the conical recess 34 at the bottom of the cutter 26 or, alternatively, the pilot 100 is positioned within the bearing 72. At that time, the bolt 60 is tightened thus locking the housing 36 to the quill 16. If desired, the quill 16 is moved upwardly with respect to the column 20 until the column 20 flatly abuts against the top 40 of the housing 36. The abutment between the column 20 and housing 38 thus provides additional support for the housing 38.

Since the center 70 or pilot 100 supports the milling cutter 26 against lateral deflection, relatively deep end cuts, as shown in FIG. 1, can be performed on the workpiece 14 without significant deflection of the cutter 26. Consequently, the actual machining time is substantially reduced over the previously known end milling operations. Furthermore, since the bottom of the cutter 26 is supported against lateral deflection by the center 70 or pilot 100, the formation of chatter marks on the end of the workpiece 14 is minimized or altogether eliminated.

Since the milling cutter 26 is preferably positioned partly within or closely adjacent the housing cavity 44 as shown in FIG. 1 of the patent drawing, in the event of breakage of the cutter 26, the housing 36 contains the broken cutter 26 and thus prevents or minimizes the possibility of injury to the machinist or other persons in the work area.

The cutter can also be replaced by an arbor (not shown) having one or more cutters mounted to it and with a pilot similar to the pilot 100 at one end.

Although the attachment of the present invention has been described primarily for use with an end milling operation, it can also be used for cutting slots in the side of the workpiece, hogging, as well as other machining operations.

Having described my invention, however, many modifications thereto will become apparent to those skilled in the art to which it pertains without deviation from the spirit of the invention as defined in the scope of the appended claims.

I claim:

1. For use in conjunction with a vertical mill having a quill and a spindle rotatably mounted within the quill, said spindle having means for clampingly holding one end of a milling cutter so that, upon rotation of said spindle, said spindle rotatably drives said milling cutter, said quill being axially slidably mounted in a column, said column having a flat and radially extending surface, a cutter support comprising, an elongated housing having two spaced ends, means for removably clampingly attaching one end of said housing to said quill so that said cutter is positioned between the ends of the housing, said one end of said housing having a flat surface which flatly abuts against said column surface, means attached to the other end of said housing for engaging the other end of the milling cutter and supporting said other end of the cutter against lateral deflection with respect to the axis of rotation of the cutter wherein said housing comprises a semicylindrical cavity extending between its ends, said cavity having an axial length greater than the axial length of the cutter, said cutter being at least partially contained within said cavity.

2. The invention as defined in claim 1 wherein said engaging means comprises a conical center rotatably mounted at said other end of said housing, said center being received within a conical recess at said other end of said cutter.

3. The invention as defined in claim 1 wherein said cutter includes a reduced diameter pilot at said other end of said cutter and wherein said engaging means comprises an aperature at said other end of said housing dimensioned and adapted to rotatably receive said pilot.

4. The invention as defined in claim 3 and comprising a bearing mounted to said housing in said aperture.

* * * * *